C. FEROCI.
ELASTIC HUB WHEEL.
APPLICATION FILED DEC. 26, 1908.

1,010,031.

Patented Nov. 28, 1911.

WITNESSES:
John C. Sanders
Leon Spring

INVENTOR
Cesare Feroci,
BY
ATTY

UNITED STATES PATENT OFFICE.

CESARE FEROCI, OF ROME, ITALY.

ELASTIC-HUB WHEEL.

1,010,031.   Specification of Letters Patent.   Patented Nov. 28, 1911.

Application filed December 26, 1908. Serial No. 469,346.

*To all whom it may concern:*

Be it known that I, CESARE FEROCI, civil-service clerk, a subject of the King of Italy, resident of 17 Piazza Cavour, Rome, Italy, have invented certain new and useful Improvements in Elastic-Hub Wheels, of which the following is a specification.

The object of my present invention is to provide an improved elastic hub wheel the main feature of which is the insertion, of a plurality of coil springs in the intermediate chambers between the hub and inner rim or crown of the wheel.

Figure 1:
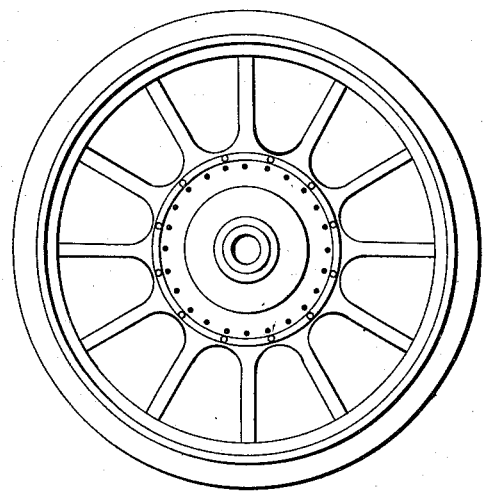
Figure 2:
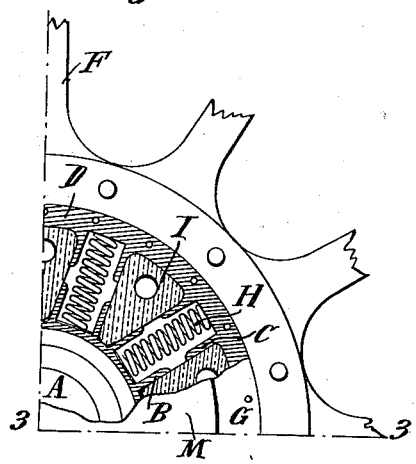
Figure 3:
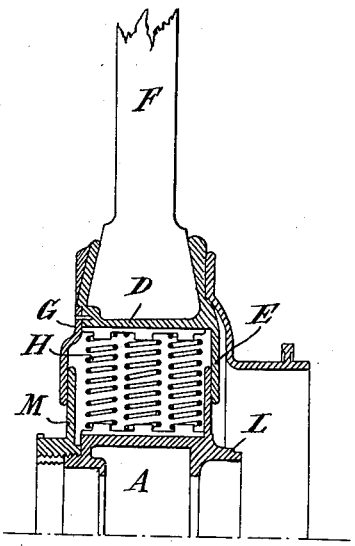

Figure 1 of the annexed drawings shows an elevation of my improved elastic hub wheel, Fig. 2 an enlarged fragmentary elevation of same, partially sectional and with cover plate partially broken away to show the interior elastic device, and Fig. 3 a half section on line 3—3 of Fig. 2.

The hub A terminates in chambers B opposite a corresponding number of chambers C cast integrally with the inner rim D and its flange E. On the inner rim D and its flange E are fixed the spokes F. Flange E of rim D, outer plate G and rim D with its chambers C are connected to hub A only by perforated rubber pads I and the coil springs H supporting the weight and load of the vehicle.

As is seen from D Fig. 3, in each of the casings formed by chambers B and C, a plurality of coil springs H (three in the case here illustrated) are placed, which are alternated with perforated rubber pads I so that on sudden jerks or jolts due to braking or obstacles the springs are not overstrained so as to be deformed.

L is an inner flange cast integrally with hub A, and M is an outer cover plate of protection which is screwed in place after the springs H and rubber pads I have been set and the outer flange G screwed home.

Having now fully described my said invention and the manner in which the same is to be performed, what I claim and desire to secure by Letters Patent of the United States of America is:

1. An elastic hub wheel comprising a hub having radial chambers on its circumference, an inner rim having radial chambers on its inner circumference, spiral springs having their ends resting in the chambers in said rim and hub, and V-shaped rubber blocks located between the adjacent springs and having their ends resting in the chambers in the rim and hub.

2. An elastic hub wheel comprising a hub having radial chambers on its circumference, certain of said chambers being provided with parallel walls and the rest of said chambers being provided with walls converging toward said hub, said second mentioned chambers being positioned in alternate relation with first mentioned chambers, an inner rim having radial chambers on its inner circumference, certain of said chambers being provided with parallel walls and being positioned opposite the first mentioned chambers on the hub, and the rest of the chambers in said rim being provided with walls converging toward said hub and being positioned opposite the second mentioned chambers on said hub, spiral springs interposed between said hub and said rim and having their ends resting in the chambers provided with parallel walls, and V-shaped rubber blocks interposed between said hub and said rim and having their narrow and wide ends resting in the chambers provided with converging walls in the hub and rim respectively.

In testimony whereof I have affixed my signature in presence of two witnesses.

CESARE FEROCI.

Witnesses:
RERRI GAARDE,
GUISEPPE COLLUNNAN.

---

Copies of this patent may be obtained for five cents each, by addressing the " Commissioner of Patents, Washington, D. C."